US011463573B2

(12) United States Patent
Crowell et al.

(10) Patent No.: US 11,463,573 B2
(45) Date of Patent: *Oct. 4, 2022

(54) NOTIFICATION BOT FOR TOPICS OF INTEREST ON VOICE COMMUNICATION DEVICES

(71) Applicant: INTERNATIONAL BUSINESS MACHINES CORPORATION, Armonk, NY (US)

(72) Inventors: Susan F. Crowell, Rochester, MN (US); Jason A. Nikolai, Rochester, MN (US); Andrew T. Thorstensen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/601,683

(22) Filed: Oct. 15, 2019

(65) Prior Publication Data

US 2020/0045160 A1 Feb. 6, 2020

Related U.S. Application Data

(63) Continuation of application No. 15/236,221, filed on Aug. 12, 2016, now Pat. No. 10,506,089.

(51) Int. Cl.
*H04M 1/64* (2006.01)
*H04M 1/656* (2006.01)
(Continued)

(52) U.S. Cl.
CPC ............ *H04M 1/656* (2013.01); *G06F 40/30* (2020.01); *G10L 15/26* (2013.01); *H04L 67/10* (2013.01);
(Continued)

(58) Field of Classification Search
CPC ....... G10L 15/26; H04M 3/56; H04M 7/0042; H04M 7/0054; H04L 67/10
See application file for complete search history.

(56) References Cited

U.S. PATENT DOCUMENTS 6,393,460 B1 * 5/2002 Gruen ................. H04L 12/1827
709/204
7,469,384 B2 12/2008 Thompson et al.
(Continued)

OTHER PUBLICATIONS

List of IBM Patents or Patent Applications Treated as Related dated Oct. 16, 2019, 2 pages.
(Continued)

*Primary Examiner* — Solomon G Bezuayehu
(74) *Attorney, Agent, or Firm* — Tutunjian & Bitetto, P.C.; Brian Welle

(57) ABSTRACT

A method and system are provided. The method includes automatically monitoring one or more voice communication sessions occurring on multiple communication devices to transcribe into text, by a processor-based voice-to-text transcriber, voices uttered by two or more respective participants other than a user in each of the voice communications sessions. The method further includes comparing, for each of the voice communication sessions, the topic of interest to conversation features derived from the text to detect a match there between. The method also includes providing the user with a summary of each of the voice communication sessions for which the match has been detected by said comparing step, the summary being based on the text. The method additionally includes automatically connecting the user to at least one of the voice communication sessions for which the summary thereof has been provided to the user.

20 Claims, 8 Drawing Sheets

(51) Int. Cl.
*H04M 3/56* (2006.01)
*H04M 7/00* (2006.01)
*H04L 67/10* (2022.01)
*G10L 15/26* (2006.01)
*G06F 40/30* (2020.01)
*G10L 15/18* (2013.01)

(52) U.S. Cl.
CPC .......... *H04M 3/56* (2013.01); *H04M 7/0042* (2013.01); *H04M 7/0054* (2013.01); *G10L 15/1822* (2013.01); *H04M 2201/40* (2013.01); *H04M 2203/5009* (2013.01)

(56) References Cited

U.S. PATENT DOCUMENTS

| | | | |
|---|---|---|---|
| 7,472,352 B2 | 12/2008 | Liversidge et al. | |
| 7,516,410 B2 | 4/2009 | Thompson et al. | |
| 7,516,411 B2 | 4/2009 | Beaton et al. | |
| 8,239,454 B2* | 8/2012 | Palermo | H04N 21/478 379/114.03 |
| 8,326,596 B2 | 12/2012 | Cohen | |
| 8,346,231 B1* | 1/2013 | Smith | H04M 3/563 379/202.01 |
| 8,521,144 B2* | 8/2013 | Quade | H04M 3/56 455/518 |
| 9,332,221 B1* | 5/2016 | Breedvelt-Schouten | H04N 7/155 |
| 9,996,874 B2* | 6/2018 | Yopp | G06T 13/20 |
| 10,404,852 B1* | 9/2019 | Garg | H04L 65/1083 |
| 10,776,700 B2* | 9/2020 | Kadiri | G06F 16/3329 |
| 2002/0075303 A1 | 6/2002 | Thompson et al. | |
| 2002/0076025 A1* | 6/2002 | Liversidge | H04L 51/04 709/204 |
| 2005/0233736 A1* | 10/2005 | Berstis | H04M 3/42221 455/416 |
| 2006/0025995 A1 | 2/2006 | Erhart et al. | |
| 2007/0192410 A1 | 8/2007 | Liversidge et al. | |
| 2010/0205541 A1* | 8/2010 | Rapaport | G06Q 30/02 715/753 |
| 2010/0216443 A1* | 8/2010 | Jacobstein | H04M 3/56 455/416 |
| 2010/0228777 A1* | 9/2010 | Imig | G06F 16/355 707/E17.108 |
| 2011/0059422 A1* | 3/2011 | Masaoka | G09B 19/06 434/157 |
| 2012/0046936 A1 | 2/2012 | Kandekar et al. | |
| 2012/0170726 A1* | 7/2012 | Schwartz | H04M 3/56 379/93.02 |
| 2012/0290978 A1* | 11/2012 | Devecka | G06Q 30/0273 715/810 |
| 2013/0144619 A1 | 6/2013 | Lord et al. | |
| 2014/0218461 A1* | 8/2014 | DeLand | H04L 51/52 704/9 |
| 2014/0321631 A1* | 10/2014 | Wu | H04M 3/42059 379/202.01 |
| 2014/0337249 A1 | 11/2014 | Bank et al. | |
| 2015/0012270 A1* | 1/2015 | Reynolds | H04L 65/403 704/233 |
| 2015/0194153 A1 | 7/2015 | Lee et al. | |
| 2015/0302763 A1* | 10/2015 | Gleim | G09B 7/04 434/237 |
| 2015/0336578 A1 | 11/2015 | Lord et al. | |
| 2016/0055571 A1* | 2/2016 | Wouhaybi | G07C 13/00 705/26.81 |
| 2016/0086605 A1 | 3/2016 | Kim et al. | |
| 2016/0364368 A1* | 12/2016 | Chen | H04L 51/216 |
| 2017/0041263 A1* | 2/2017 | Shekel | H04L 51/04 |
| 2017/0060917 A1* | 3/2017 | Marsh | H04L 65/1069 |
| 2017/0223064 A1* | 8/2017 | Le Devehat | G06F 3/04847 |
| 2018/0302761 A1* | 10/2018 | Rizzolo | H04L 12/1822 |

OTHER PUBLICATIONS

List of IBM Patents or Patent Applications Treated as Related dated Oct. 15, 2019, 2 pages.
IBM et al., "Notification of Delivery Mechanism in a UC System", IP.com, An IP.com Prior Art Database Technical Disclosure, Sep. 2009, 8 pages.
Livingood, et al., "Recommendations for the Remediation of Bots in ISP", IP.com, An IP.com Prior Art Database Technical Disclosure, Mar. 2012, 59 pages.
List of IBM Patents or Patent Applications Treated as Related dated Aug. 12, 2016, 1 page.
Notice of Allowance dated May 9, 2018 for U.S. Appl. No. 15/236,243, 16 pages.

\* cited by examiner

NOTIFICATION BOT FOR TOPICS OF INTEREST ON VOICE COMMUNICATION DEVICES

BACKGROUND

The present invention relates generally to information processing and, in particular, to a notification bot for topics of interest on voice communication devices.

Business people spend an ever increasing amount of time on the phone as the locations where their work is performed is constantly expanding. Moreover, there are times when professionals need to be on multiple calls. However, in many cases, only a small percentage of a call applies to a particular person. Accordingly, a significant amount of money is wasted in cases where a person is involved in many calls, but for only a small part of each call. Thus, there is a need for reducing unnecessary costs (pecuniary, time, etc.) associated with voice communications.

SUMMARY

According to an aspect of the present principles, a method is provided. The method includes automatically monitoring one or more voice communication sessions occurring on multiple communication devices to transcribe into text, by a processor-based voice-to-text transcriber, voices uttered by two or more respective participants other than a user in each of the one or more voice communications sessions. The method further includes comparing, for each of the one or more voice communication sessions, the topic of interest to conversation features derived from the text to detect a match there between. The method also includes providing the user with a summary of each of the one or more voice communication sessions for which the match has been detected by said comparing step, the summary being based on the text. The method additionally includes automatically connecting the user to at least one of the one or more voice communication sessions for which the summary thereof has been provided to the user.

According to another aspect of the present principles, a computer program product is provided for user notification in voice communications. The computer program product includes a non-transitory computer readable storage medium having program instructions embodied therewith. The program instructions are executable by a computer to cause the computer to perform a method. The method includes automatically monitoring one or more voice communication sessions occurring on multiple communication devices to transcribe into text, by a processor-based voice-to-text transcriber, voices uttered by two or more respective participants other than a user in each of the one or more voice communications sessions. The method further includes comparing, for each of the one or more voice communication sessions, the topic of interest to conversation features derived from the text to detect a match there between. The method also includes providing the user with a summary of each of the one or more voice communication sessions for which the match has been detected by said comparing step, the summary being based on the text. The method additionally includes automatically connecting the user to at least one of the one or more voice communication sessions for which the summary thereof has been provided to the user.

According to yet another aspect of the present principles, a system is provided. The system includes a server, having a processor, a memory, and a network adapter. The server is configured to automatically monitor one or more voice communication sessions occurring on multiple communication devices to transcribe into text voices uttered by two or more respective participants other than a user in each of the one or more voice communications sessions. The server is further configured to compare, for each of the one or more voice communication sessions, the topic of interest to conversation features derived from the text to detect a match there between. The server is also configured to provide the user with a summary of each of the one or more voice communication sessions for which the match has been detected by said comparing step, the summary being based on the text. The server is additionally configured to automatically connect the user to at least one of the one or more voice communication sessions for which the summary thereof has been provided to the user.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

The present principles are directed to a notification bot for topics of interest on voice communication devices.

In an embodiment, the present principles implement live natural language processing to transcribe calls to text. That text is then monitored for specific topics of interest. In an embodiment, the present principles can include the following two aspects. First, the user inputs topics of interest. If an agenda for the call is available, then the agenda is tracked (that is, matched to the call) based on the text analytics of the transcribed call. When the topic of interest is near, the user is notified to join the call and a summary of the meeting up to that point is delivered via text message, email, and/or so forth so that the user can quickly scan the summary for relevant points and catch up. Second, the present principles can be used to monitor one or more calls. The user enters topics of interests. An agenda may or may not exist for the meetings. When topics related to the inputted topic of interests are detected in one or more calls, a message is sent to the user with a summary (e.g., of the last n minutes of the call) and the call is automatically connected via VoIP or other communication/telephony technology. The present principles can enable a single user to jump between calls and listen to areas of interest and contribute to each of the calls as needed.

In an embodiment, the present principles can be applied to any voice input that a user wishes to only reference a subset of the overall voice input.

Figure 1:
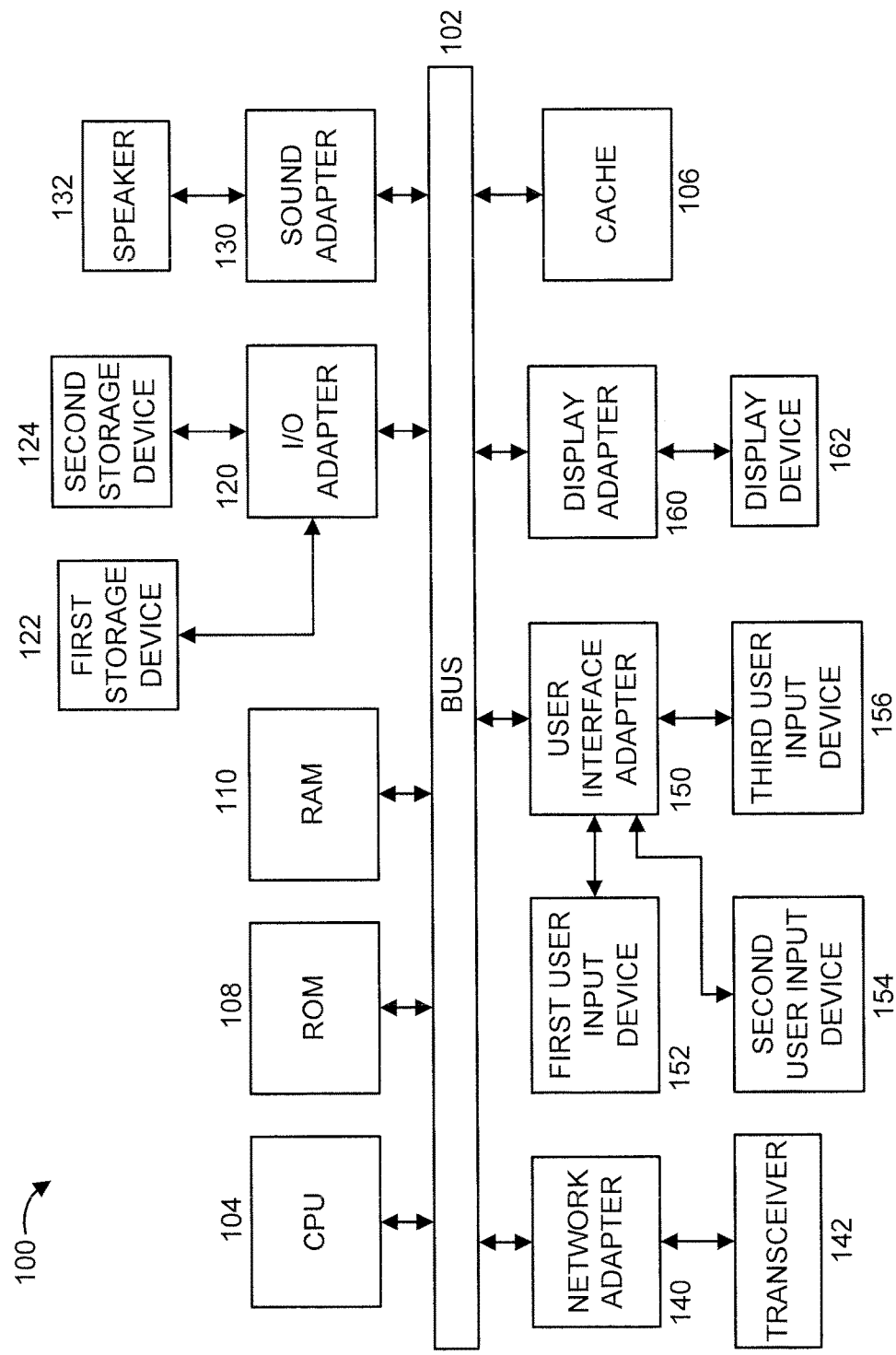
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
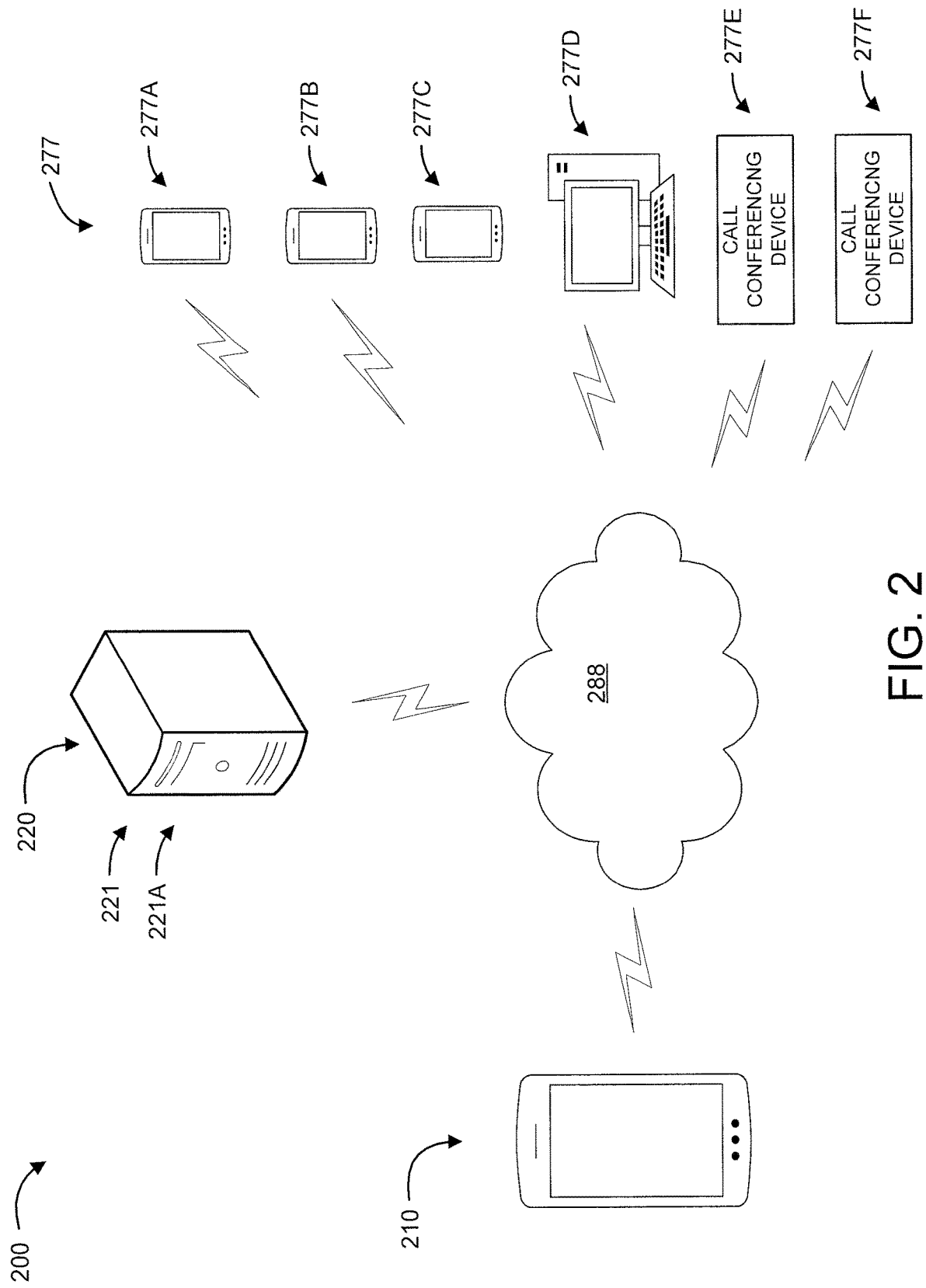
FIG. 2 shows an exemplary system for providing a notification of topics of interest on voice communication devices, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
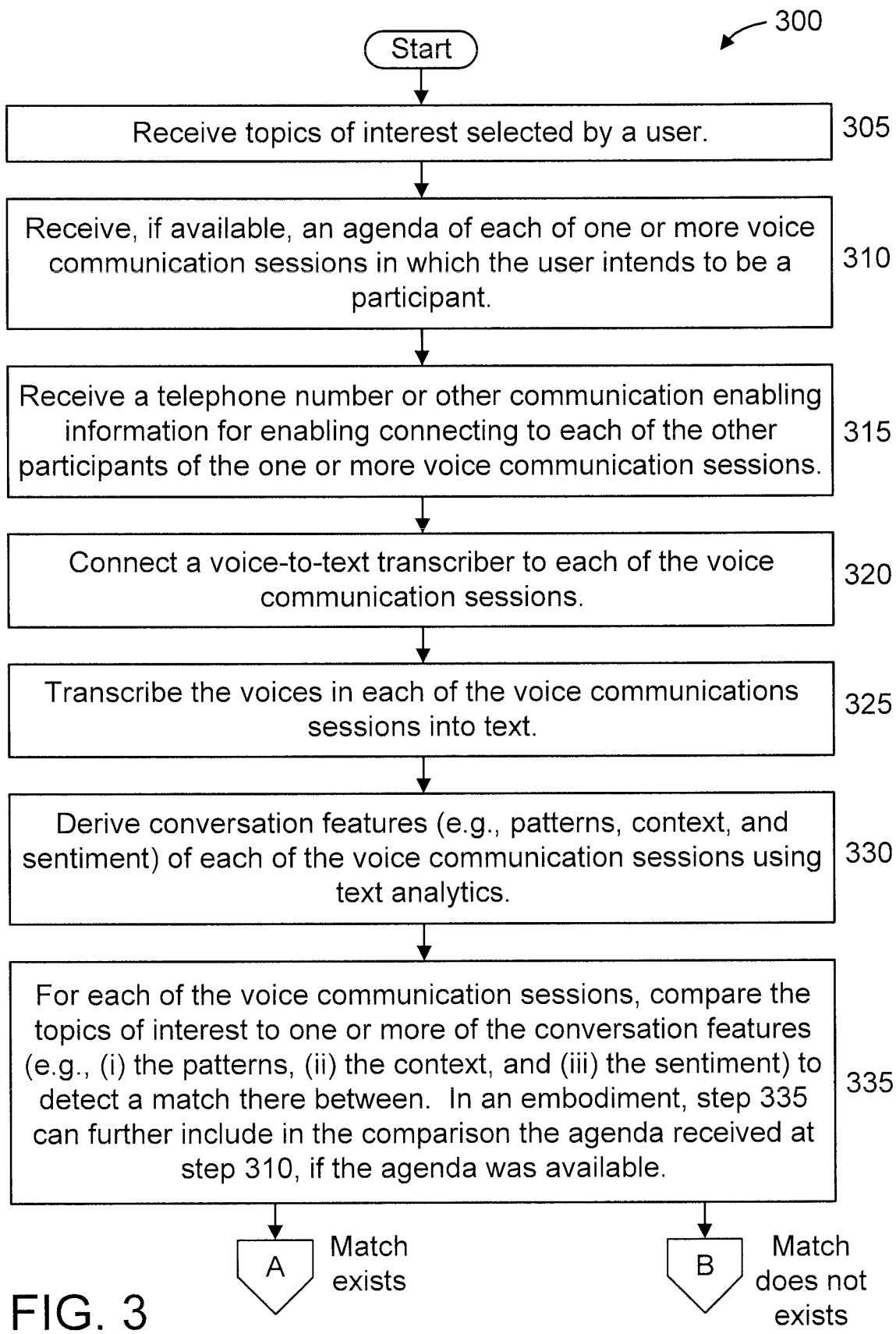
FIGS. 3-4 show an exemplary method for providing a notification of topics of interest on voice communication devices, in accordance with an embodiment of the present principles.
Figure 4:
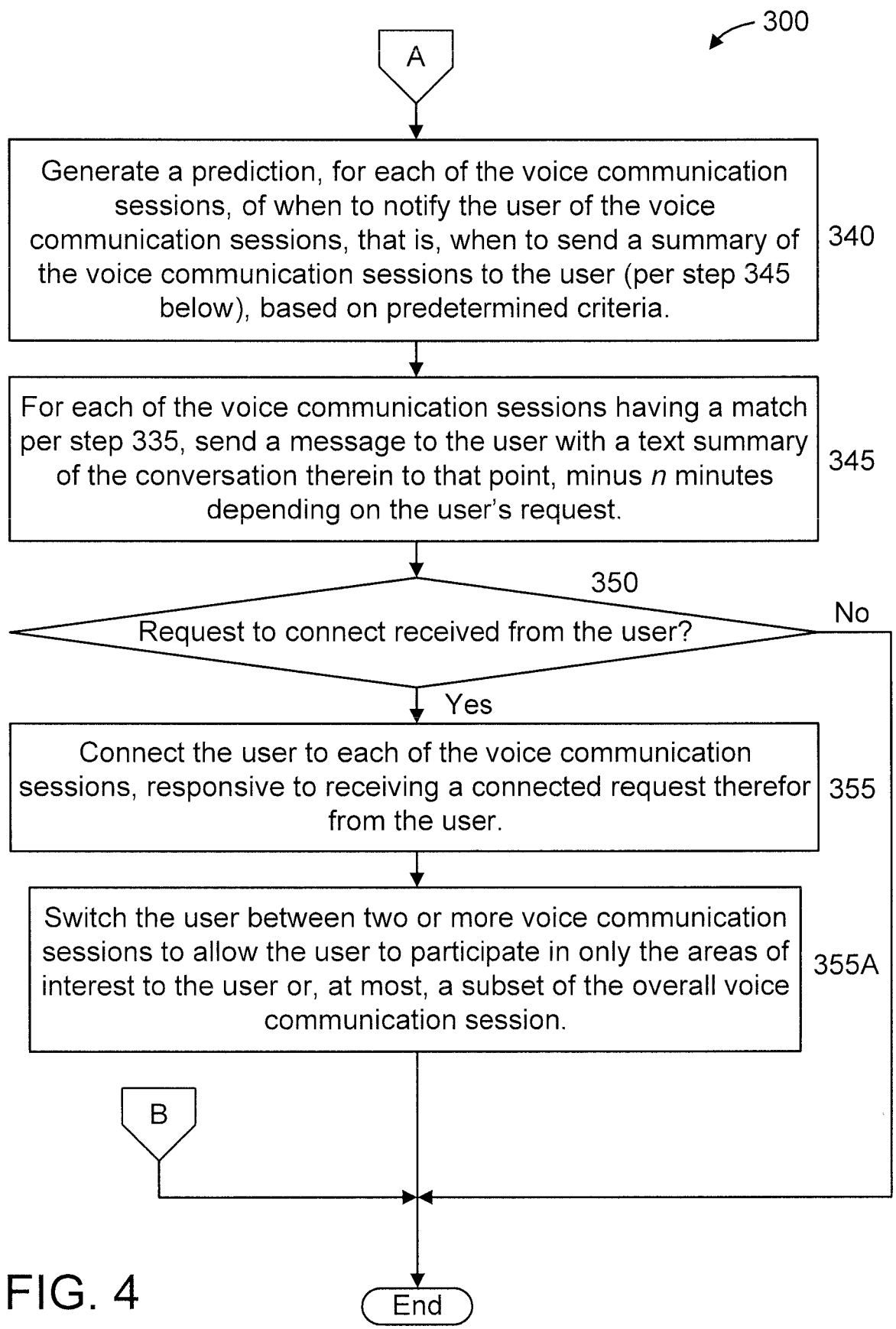
Figure 5:
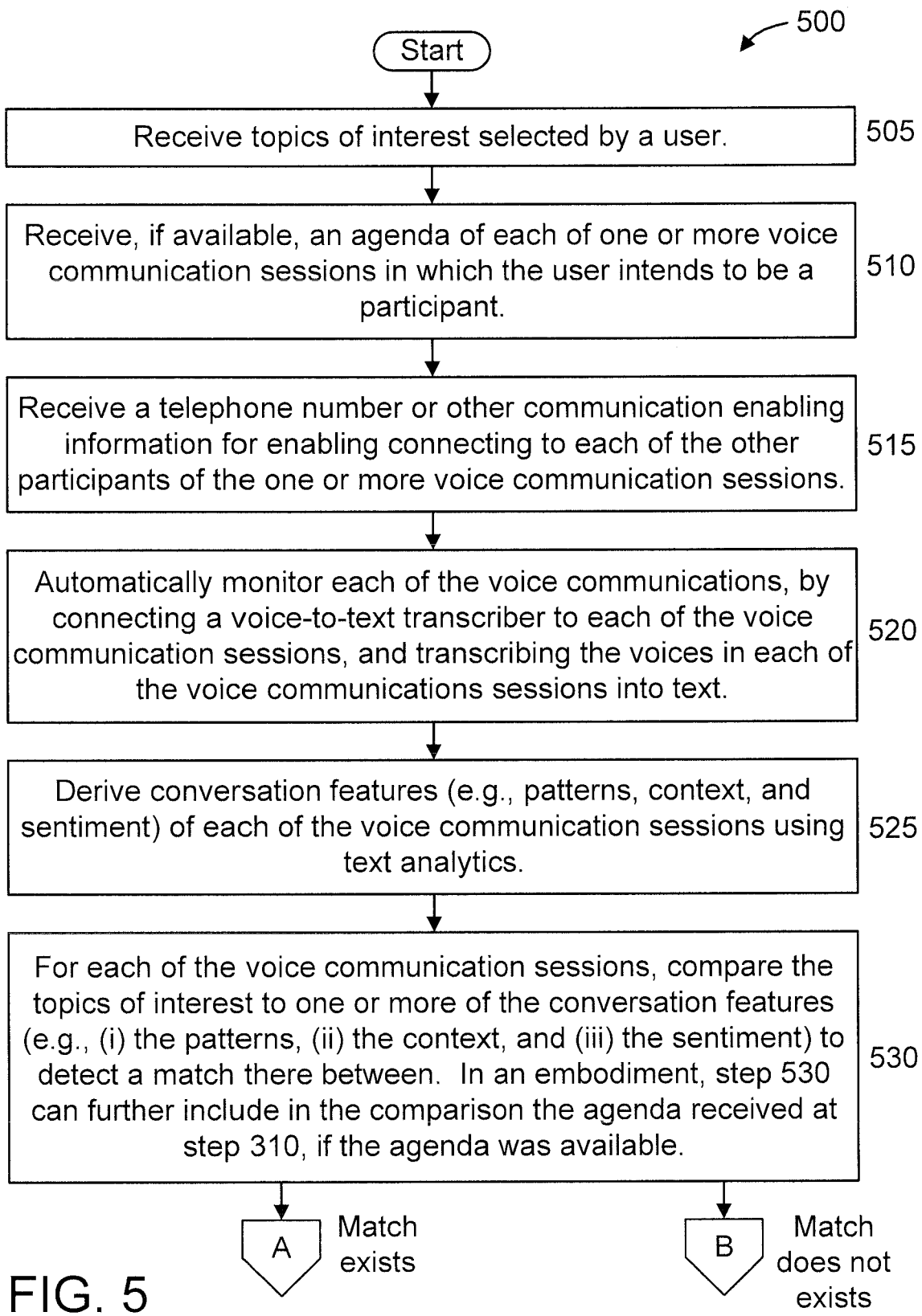
FIGS. 5-6 show an exemplary method for providing a notification of topics of interest on voice communication devices, in accordance with an embodiment of the present principles.
Figure 6:
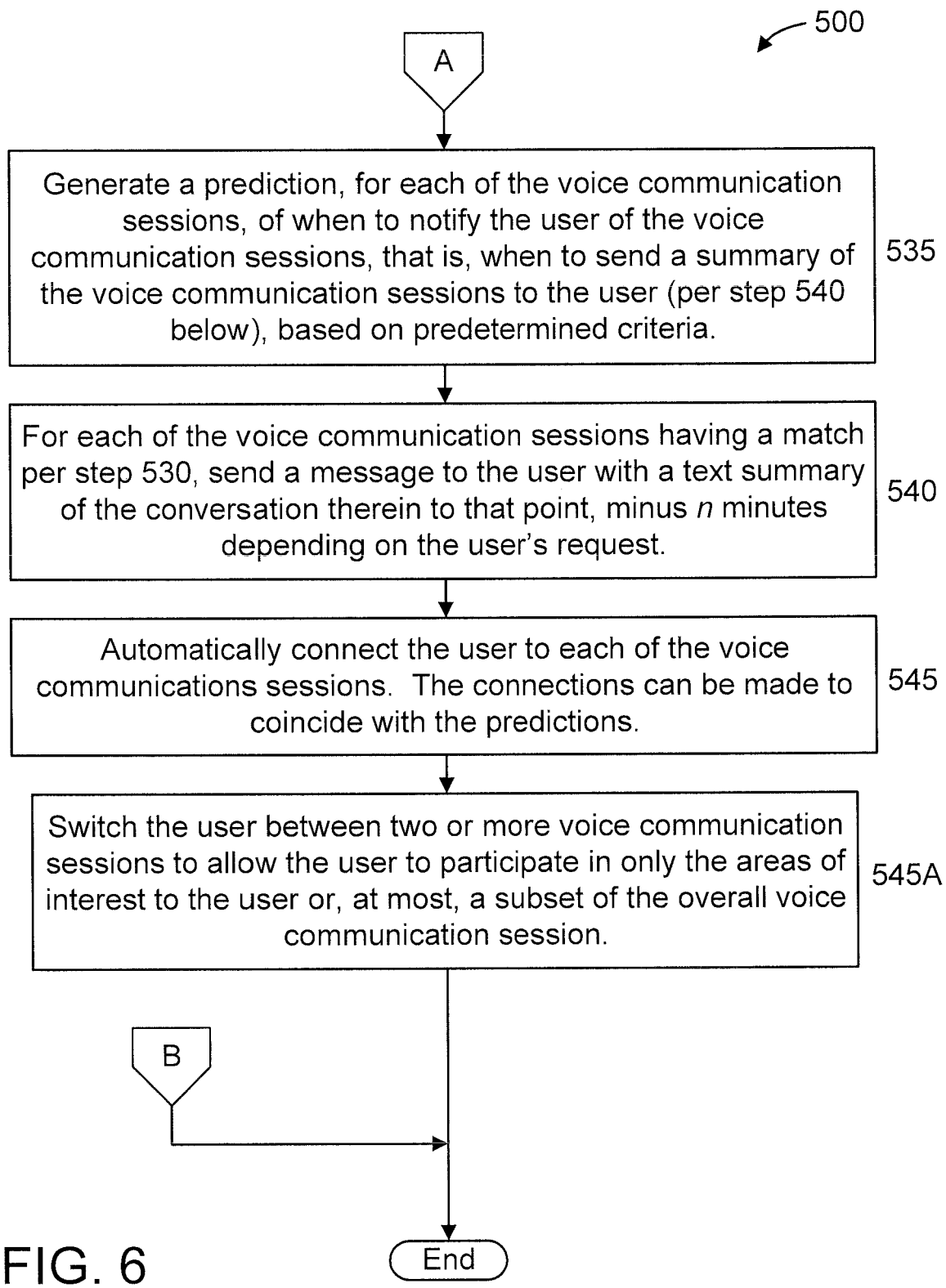

Further, it is to be appreciated that processing system 100 may perform at least part of the method described herein including, for example, at least part of method 300 of FIGS. 3-4 and/or at least part of method 500 of FIGS. 5-6. Similarly, part or all of system 200 may be used to perform at least part of method 300 of FIGS. 3-4 and/or at least part of method 500 of FIGS. 5-6.

FIG. 2 shows an exemplary system 200 for providing a notification of topics of interest on voice communication devices, in accordance with an embodiment of the present principles.

The system 200 includes a voice communication device 210 and a server 220. The voice communication device 210 corresponds to a user of system 200 and is hereinafter interchangeably referred to as "user communication device" 210.

Figure 7:
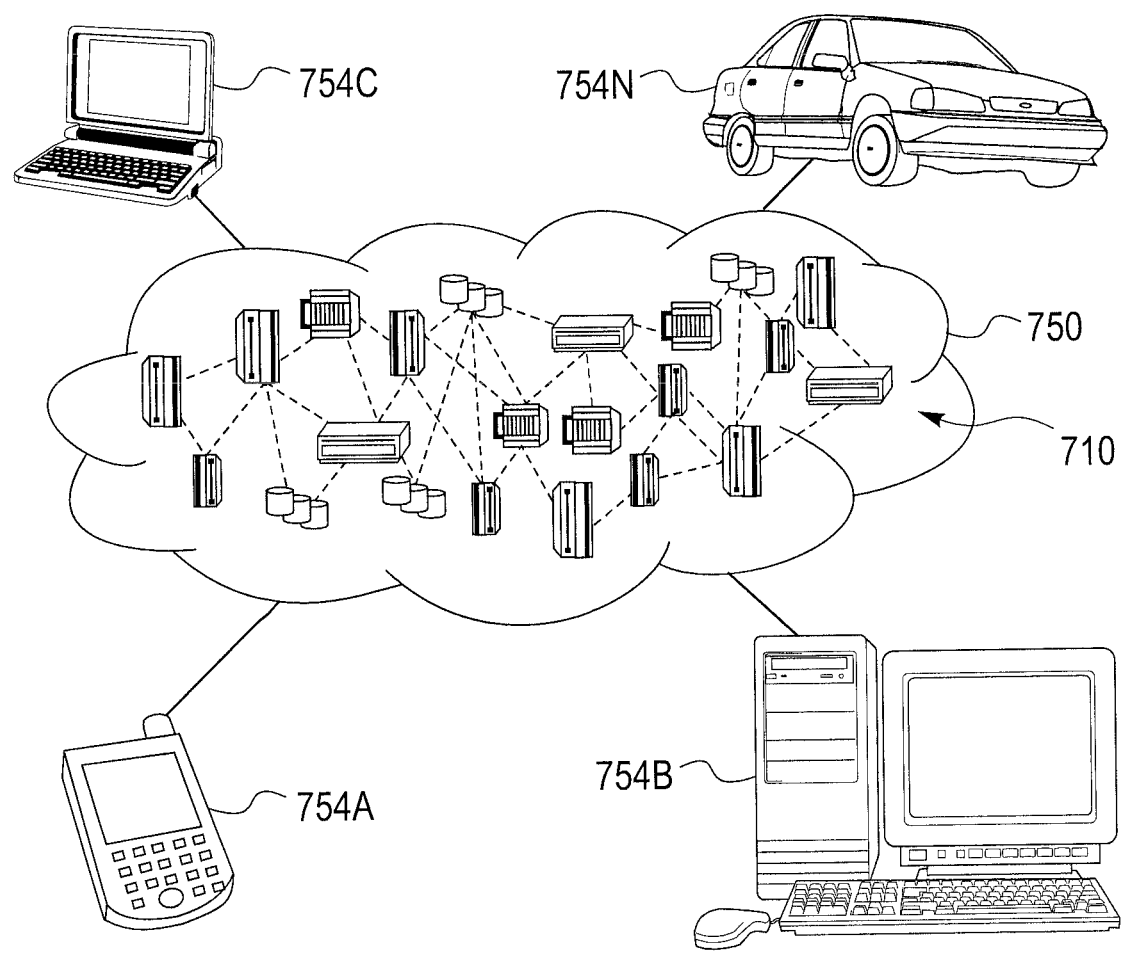
FIG. 7 shows an exemplary cloud computing environment, in accordance with an embodiment of the present principles.
Figure 8:
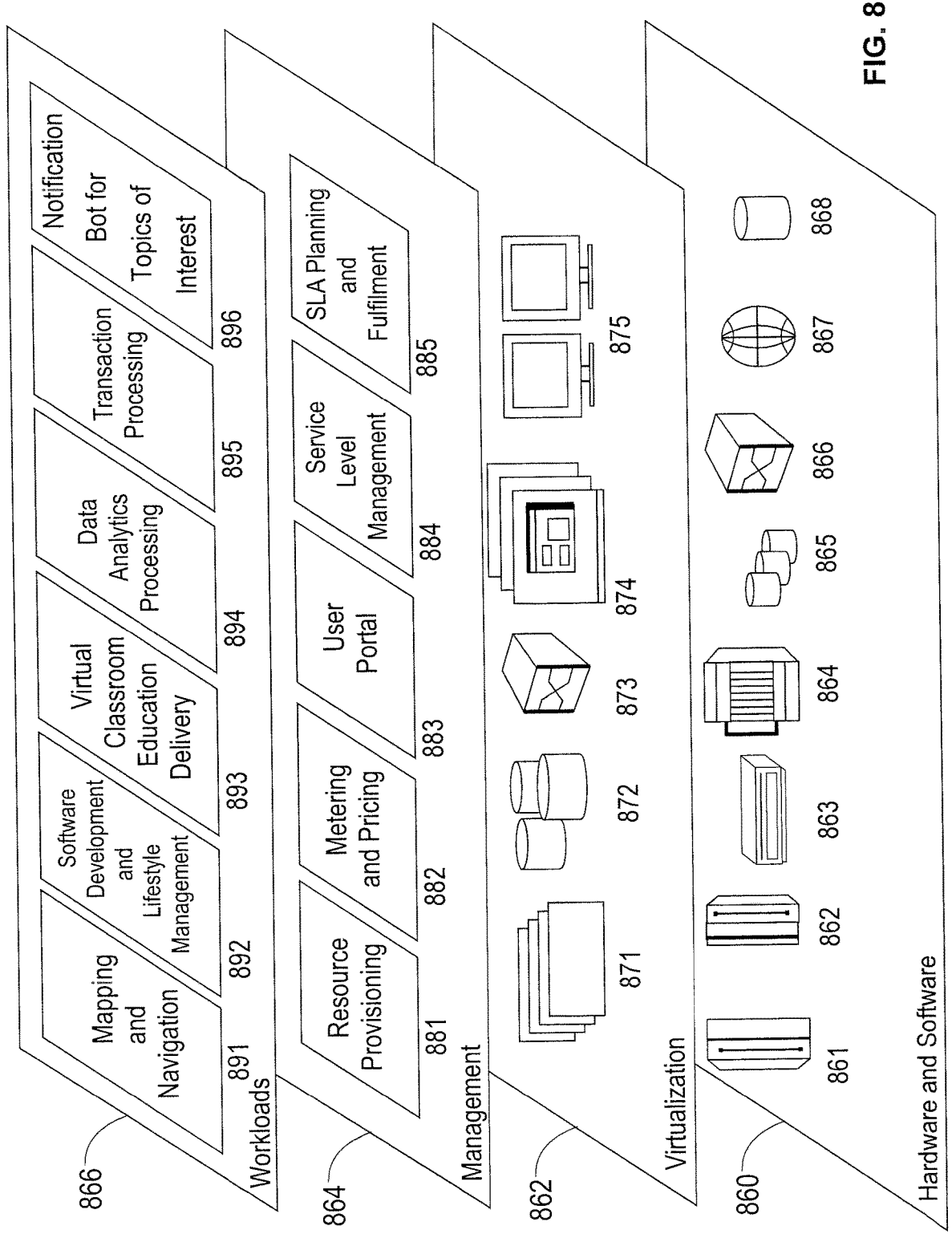
FIG. 8 shows an exemplary set of functional abstraction layers provided by the cloud computing environment shown in FIG. 7, in accordance with an embodiment of the present principles.

It is to be appreciated that some of the functions/processes described herein relating to system 200 can be implemented using a cloud configuration (see, e.g., FIGS. 7-8). For example, the functions described below relating to generating summaries of voice communication sessions and so forth can be implemented in the cloud, depending upon the specific implementation of the present principles. Such implementations can depend on the resources available on the user communication device 210, as well as the resources on other voice communication devices to which the user's communication device may connect to. These and other variations of system 200 as well as the devices that interface therewith are readily determined by one of ordinary skill in the art given the teachings of the present principles provided herein, while maintaining the spirit of the present principles.

The user communication device 210 can be any type of voice communication device including mobile and stationary voice communication devices. For example, the user communication device can be a mobile telephone (e.g., smart phone), laptop, tablet, desktop computer, a call conferencing device, and so forth. As is known, the preceding and other devices are able to provide voice communication for a user thereof. In the embodiment of FIG. 2, the user communication device 210 is implemented as a smart phone for the sake of illustration.

The user communication device 210 at least includes a processor, a memory, a speaker, a display, and structural devices for enabling communication (network adapters and so forth). Additionally, in an embodiment, the server 210 at least includes a processor, a memory, and structural devices for enabling communication (network adapters and so forth). As these elements are shown in FIG. 1, reiterating as noted above that elements in FIG. 1 can also be in any of the elements of system 200, such elements are omitted from FIG. 2 for the sake of brevity and clarity.

The server 220 further includes a voice-to-text transcriber 221. The voice-to-text transcriber 221 includes a natural language processor 221A for using natural language processing to generate the resultant transcriptions from voice inputs.

The voice communication device 210 is configured to engage in voice communication sessions with other voice communication devices. Accordingly, the operating environment 299 of the voice communication device 210 includes one or more other voice communication devices (collectively denoted by the figure reference numeral 277, and interchangeably referred to as "other communication devices" in short). In the embodiment of FIG. 2, the one or more other communication devices 277 include a smartphone 277A, a smartphone 277B, a smartphone 277C, a desktop computer 277D, a call conferencing device 277E, and a call conferencing device 277F, for the sake of illustration. Of course, any other devices capable of voice communication sessions can also be used, while maintaining the spirit of the present principles. For the sake of illustration, a first voice communication session can occur between devices 277A and 277B, while a second voice communication session can occur between devices 277C, 277D, and 277E. Of course, the preceding assignments of parties to the voice communication sessions are merely arbitrary and, thus, other assignments can also be used. In an embodiment, the user can be join these voice communication sessions at a time that is most opportune for the user, that is, based on the user's interest and/or other criteria, such that the user does not have be a part of the entirety of each of the voice communication sessions.

The communication sessions can occur over one or more networks (collectively denoted by the figure reference numeral 288). The one or more networks 288 can include any type of networks such as, for example, but not limited to, cellular networks, local area networks, wide area networks, personal area networks, wireless networks, wired networks, any combination of the preceding, and so forth. In the embodiment of FIG. 2, the one or more networks 288 are implemented by one or more wireless networks for the sake of illustration.

The server 220 is configured to receive information for enabling connecting to each of the other participants of the voice communication sessions in which the user can potentially participate.

The server 220 is configured to receive one or more topics of interest to the user and agendas for the voice communication sessions.

The server 220 is configured to transcribe, using the voice-to-text transcriber 221 that, in turn, uses the natural language processor 221A, to generate transcriptions (text) of the voices in the voice communication sessions (which will not yet or may not ever include the user as a participant).

Based upon analytics determined from the text, the server 220 can generate predictions of when a topic of interest(s) will be brought during each of the voice communication sessions. The user can be provided a summary of the conversations in these voice communications session prior to the user joining the same in order for the user decide whether or not the user wants to join the voice communication sessions. In some embodiments, the user will automatically be connected to these voice communication sessions, while in other embodiments, the user can specifically request a respective connection to these voice communication session.

Further details regarding the operation of the involved devices including devices 210, 220, and 277 will be further described below with respect to FIGS. 3-6 and also FIGS. 7-8, depending upon the implementation.

FIGS. 3-4 show an exemplary method 300 for providing a notification of topics of interest on voice communication devices, in accordance with an embodiment of the present principles.

At step 305, receive topics of interest selected by a user.

At step 310, receive, if available, an agenda of each of one or more voice communication sessions in which the user intends to be a participant. Each of the voice communication sessions can involve three or more participants (including the user, should the user ultimately join the voice communication session) and three or more communication devices (including the user's communication device, should the user ultimately join the voice communication session), each voice communication session corresponding to a separate conversation, meeting, and/or so forth.

At step 315, receive a telephone number or other communication enabling information (Internet Protocol (IP) address, Media Access Control (MAC) address, and so forth) (hereinafter collectively referred to as "voice communication session enabling information") for enabling connecting to each of the other participants of the one or more voice communication sessions. As is known, such information can pertain to the device corresponding to a respective participant.

At step 320, connect a voice-to-text transcriber (hereinafter "text transcriber" in short) to each of the voice communication sessions.

At step 325, transcribe the voices in each of the voice communications sessions into text. As is evident, at least two participants other than the user are engaged in each of the voice communications session in order for a conversation to occur.

At step 330, derive conversation features (e.g., patterns, context, and sentiment) of each of the voice communication sessions using text analytics.

At step 335, for each of the voice communication sessions, compare the topics of interest to one or more of the conversation features (e.g., (i) the patterns, (ii) the context, and (iii) the sentiment) to detect a match there between. In an embodiment, step 335 can further include in the comparison the agenda received at step 310, if the agenda was available. If a match exists, proceed to step 340. Otherwise, the method is terminated.

At step 340, generate a prediction, for each of the voice communication sessions, of when to notify the user of the voice communication sessions, that is, when to send a summary of the voice communication sessions to the user (per step 345 below), based on predetermined criteria.

The predetermined criteria can include one or more of (i) the topics of interest received at step 305, (ii) the agenda received at step 310, (iii) the patterns derived at step 335, (iv) the context derived at step 335, (v) the sentiment derived at step 335, (vi) the speed at which the voice communication session is progressing, and (vii) voice communication session history involving the same participants. As is evident to one of ordinary skill in the art, step 340 can involve determining the speed at which the voice communication session is progressing and accessing from a database of other repository a voice communication history involving the same participants. While some of the preceding criteria are mentioned in singular form, more than one (plurals) of the same can be used.

In an embodiment, the prediction is generated with respect to a duration before a topic of interest is to be discussed in the voice communication session. In an embodiment, the prediction is generated to allow the user enough time to review the summary prior to being connected to the voice communication session.

At step 345, for each of the voice communication sessions having a match per step 335, send a message to the user with a text summary of the conversation therein to that point, minus n minutes depending on the user's request. That is, the n minutes correspond to the latency from the end time at which the summary is taken to the time the summary is provided to the user. The summary allows to use to become aware of who is participating in the voice communication sessions and other relevant information (e.g., but not limited to, patterns, context, sentiment, and so forth).

At step 350, determine if a connect request has been received from the user for any of the voice communication sessions having a match per step 335. If so, proceed to step 355. Otherwise, the method is terminated.

At step 355, connect the user to each of the voice communication sessions, responsive to receiving a connected request therefor from the user (as determined per step 350).

In an embodiment, step 355 includes step 355A.

At step 355A, switch (jump) the (single) user between two or more voice communication sessions to allow the user to participate in only the areas of interest to the user (as received from the user at step 310) or, at most, a subset of the overall voice communication session. The switching can be done, responsive to receiving a connect request from the user for the two or more communication sessions. It is to be appreciated that despite the fact that the user is jumping between two or more voice communication sessions, such sessions can be occurring simultaneously (with the user jumping into each one at different times or even possibly overlapping times).

FIGS. 5-6 show an exemplary method 500 for providing a notification of topics of interest on voice communication devices, in accordance with an embodiment of the present principles.

At step 505, receive topics of interest selected by a user.

At step 510, receive, if available, an agenda of each of one or more voice communication sessions in which the user intends to be a participant. Each of the voice communication sessions can involve three or more participants (including the user, should the user ultimately join the voice communication session) and three or more communication devices (including the user's communication device, should the user ultimately join the voice communication session), each voice communication session corresponding to a separate conversation, meeting, and/or so forth.

At step 515, receive a telephone number or other communication enabling information (Internet Protocol (IP) address, Media Access Control (MAC) address, and so forth) (hereinafter collectively referred to as "voice communication session enabling information") for enabling connecting to each of the other participants of the one or more voice communication sessions. As is known, such information can pertain to the device corresponding to a respective participant.

At step 520, automatically monitor each of the voice communications, by connecting a voice-to-text transcriber (hereinafter "text transcriber" in short) to each of the voice communication sessions, and transcribing the voices in each of the voice communications sessions into text. As is evident, at least two participants other than the user are engaged in each of the voice communications session in order for a conversation to occur.

At step 525, derive conversation features (e.g., patterns, context, and sentiment) of each of the voice communication sessions using text analytics.

At step 530, for each of the voice communication sessions, compare the topics of interest to one or more of the conversation features (e.g., (i) the patterns, (ii) the context, and (iii) the sentiment) to detect a match there between. In an embodiment, step 530 can further include in the comparison the agenda received at step 510, if the agenda was available. If a match exists, proceed to step 535. Otherwise, the method is terminated.

At step 535, generate a prediction, for each of the voice communication sessions, of when to notify the user of the voice communication sessions, that is, when to send a summary of the voice communication sessions to the user (per step 540 below), based on predetermined criteria.

The predetermined criteria can include one or more of (i) the topics of interest received at step 505, (ii) the agenda received at step 510, (iii) the patterns derived at step 530, (iv) the context derived at step 530, (v) the sentiment derived at step 530, (vi) the speed at which the voice communication session is progressing, and (vii) voice communication session history involving the same participants. As is evident to one of ordinary skill in the art, step 535 can involve determining the speed at which the voice communication session is progressing and accessing from a database of other repository a voice communication history involving the same participants. While some of the preceding criteria are mentioned in singular form, more than one (plurals) of the same can be used.

In an embodiment, the prediction is generated with respect to a duration before a topic of interest is to be discussed in the voice communication session. In an embodiment, the prediction is generated to allow the user enough time to review the summary prior to being connected to the voice communication session.

At step 540, for each of the voice communication sessions having a match per step 530, send a message to the user with a text summary of the conversation therein to that point, minus n minutes depending on the user's request. That is, the n minutes correspond to the latency from the end time at which the summary is taken to the time the summary is provided to the user. The summary allows to use to become aware of who is participating in the voice communication sessions and other relevant information (e.g., but not limited to, patterns, context, sentiment, and so forth).

At step 545, automatically connect the user to each of the voice communications sessions. The connections can be made to coincide with the predictions.

In an embodiment, step 545 includes step 545A.

At step 545A, automatically switch (jump) the (single) user between two or more voice communication sessions to allow the user to participate in only the areas of interest to the user (as received from the user at step 510) or, at most, a subset of the overall voice communication session. It is to be appreciated that despite the fact that the user is jumping between two or more voice communication sessions, such sessions can be occurring simultaneously (with the user jumping into each one at different times or even possibly overlapping times).

As used herein with respect to method 300 of FIGS. 3-4 and method 500 of FIGS. 5-6, the phrase "connecting the user to voice communication sessions" and similar phrases can involve actually connecting the user to the other participants, or initiating the connecting, for example, by providing the user device with, or causing the user to be provided with, connecting information and/or connecting options (e.g., a button, widget, or other user interface on the user's device that would cause the connection), managing the connecting of the user's device, and so forth. Regarding managing the connecting of the user's device, the same can involve, for example, timing the connecting with the bringing up of the topic of interest (e.g., based on the prediction per step 340, the duration relating to the prediction as per step 340, a user request to connect per step 350, etc.), and so forth. Thus, in some embodiments, the server 220 can act as a call manager and/or at least perform any of the preceding described functions. In other cases, the user device 210 can manage the connecting. These and other variations of the present principles are readily determined by one of ordinary skill in the art given the teachings of the present principles provided herein, while maintaining the spirit of the present principles.

A brief description will now be given regarding some of the many attendant advantages provided by the present principles.

One advantage is a reduction in the cost of wasted time on these calls. For example, financial news reporters may need to be on multiple earnings calls. In such a case, the present principles can assist one reporter to report on multiple concurrent calls.

Another advantage is a reduction in the pecuniary cost associated with spending time on calls for which a user only needs to be a part of.

These and other advantages are readily determined by one of ordinary skill in the art given the teachings of the present principles provided herein, while maintaining the spirit of the present principles.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and notification bot for topics of interest on voice communication devices The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims:

1. A computer-implemented. method, comprising:
   automatically transcribing, using a processor device, voices uttered by one or more participants other than a user in each of a plurality of communication sessions from a plurality of communicationdevices into text;
   comparing, for each of the communication sessions, one or more topics of interest to conversation features derived from the text to detect a match there between;
   generating a prediction, for each of the plurality of communication sessions for which intended participation is indicated by the user, of when to send a summary to the user based on predetermined criteria, the predetermined criteria including at least an agenda for the each of the plurality of communication sessions for-which intended participation is indicated by the user, the topics of interest, and voice communication session history for the one or more participants and the user;
   generating and delivering to the user the summary based n the text for each of the communication sessions with matches detected by the comparing, the summary including the derived conversation features of each of the communication sessions; and
   automatically connecting the user to at least one of the communication sessions for which intended participation is indicated by the user and for which the summary has been generated and delivered to the user.

2. The method of claim 1, wherein the user is automatically connected to the at least one of the plurality of voice communication sessions such that the user participates in only a subset of an overall conversation in each of the at least one of the one or more voice communication sessions.

3. The method of claim 1, wherein the summary informs the user of the respective participants and other information relating to respective contents of the plurality of voice communication sessions.

4. The method of claim 1, wherein said comparing step further compares the agenda of each of the plurality of voice communication sessions to the conversation features to determine the match.

5. The method of claim 1, wherein the conversation features comprise patterns, context, and sentiment of each of the plurality of voice communication sessions.

6. The method of claim 1, wherein the conversation features are derived from the text using text analytics.

7. The method of claim 1, wherein the voices are transcribed into the test using live natural language processing.

8. The method of claim 1, wherein the plurality of voice communication sessions comprise two or more voice communication sessions, and the method further comprises switching the user between two or more of the voice communication sessions to allow the user to participate in only a respective discussion of the area of interest to the user during the two or more voice communication sessions.

9. The method of claim 8, wherein the two or more of the voice communication sessions at least partially overlap in time.

10. The method of claim 1, further comprising automatically monitoring the text for occurrences of the topic of interest therein.

11. The method of claim 1, wherein the summary of each of the plurality of communication sessions is provided to the user using a communication medium selected from the group consisting of an email message and a text message.

12. A computer program product for user notification in voice communications, the computer program product comprising a non-transitory computer readable storage medium havingprogram instructions embodied therewith, the program instructions executable by a computer to cause the computer to perform a method comprising:
  automatically transcribing, using a processor device, voices uttered by one or more participants other than a user in each of a plurality of communication sessions from a plurality of communication devices into text;
  comparing, for each of the communication sessions, one or more topics of interest to conversation features derived from the text to detect a match there between;
  generating a prediction, for each of the plurality of communication sessions for which intended participation is indicated by the user, of when to send a summary to the user based on predetermined criteria, the predetermined criteria including at least an agenda for the each of the plurality of communication sessions for which intended narticipation is indicated by the user, the topics of interest and voice communication session history for the one or more participants and the user;
  generating and delivering to the user the summary based on the text for each of the communication sessions with matches detected by the comparing, the summary including the derived conversation features of each of the communication sessions; and
  automatically connecting the user to at least one of the communication sessions for which intended participation is indicated by the user and for which the summary has been generated and delivered to the user.

13. The computer program product of claim 12, wherein the user is automatically connected to the at least one of the plurality of communication. sessions such that the user participates in only a subset of an overall conversation in each of the at least one of the plurality of communication sessions.

14. The computer program product of claim 12, wherein said comparing step further compares an agenda of each of the plurality of communication sessions to the conversation features to determine the match.

15. The computer program product of claim 12, wherein the voices are transcribed into the test using live natural language processing.

16. The computer program product of claim 12, wherein the plurality of communication sessions comprise two or more voice communication sessions, and the method further comprises switching the user between two or more of the voice communication sessions to allow the user to participate in only a respective discussion of the area of interest to the user during the two or more voice communicationsessions.

17. The computer program product of claim 16, wherein the two or more of the voice communication sessions at least partially overlap in time.

18. The computer program product of claim 12, wherein the summary of each of the plurality of communication sessions is provided to the user using a communication medium selected from the group consisting of an email message and a text message.

19. A system, comprising:
  a server, having a processor device, a memory, and a network adapter, the server being configured to:
  automatically transcribe voices uttered by one or more participants other than a user in each of a plurality of communication sessions from a plurality of communication devices into text;
  compare, for each of the communication sessions, one or more topics of interest to conversation features derived from the text to detect a match there between;
  generating a prediction, for each of the plurality of communication sessions for which intended participation is indicated by the user, of when to send a summary to the user based on predetermined criteria, the predetermined criteria including at least an agenda for the each of the plurality of communication sessions for which intended participation is indicated by the user, the topics of interest and voice communication session history for the one or more participants and the user;
  generate and deliver to the user the summary based on the text for each of the communication sessions with matches detected by the comparing, the summary including the derived conversation features of each of the communication sessions; and
  automatically connect the user to at least one of the communication sessions for which intended participation is indicated by the user and for which the summary has been generated and delivered to the user.

20. The system of claim 19, wherein the server is implementing using a cloud configuration.

* * * * *